(12) United States Patent
Zhou et al.

(10) Patent No.: US 12,267,741 B2
(45) Date of Patent: Apr. 1, 2025

(54) NETWORK SWITCHING METHOD AND APPARATUS

(71) Applicant: HUAWEI TECHNOLOGIES CO., LTD., Guangdong (CN)

(72) Inventors: Jianwei Zhou, Hangzhou (CN); Hejia Luo, Hangzhou (CN); Chenlei Xu, Hangzhou (CN); Xiaolu Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 17/738,810

(22) Filed: May 6, 2022

(65) Prior Publication Data

US 2022/0264417 A1 Aug. 18, 2022

Related U.S. Application Data

(63) Continuation of application No. PCT/CN2020/120436, filed on Oct. 12, 2020.

(30) Foreign Application Priority Data

Nov. 8, 2019 (CN) .......................... 201911086384.2

(51) Int. Cl.
*H04W 36/32* (2009.01)
*H04W 36/00* (2009.01)
*H04W 36/14* (2009.01)

(52) U.S. Cl.
CPC ....... *H04W 36/0085* (2018.08); *H04W 36/14* (2013.01); *H04W 36/322* (2023.05); *H04W 36/324* (2023.05)

(58) Field of Classification Search
CPC ............ H04W 36/0085; H04W 36/14; H04W 36/322; H04W 36/324; H04B 7/18541;
(Continued)

(56) References Cited

U.S. PATENT DOCUMENTS 5,999,797 A 12/1999 Zancho et al.
6,421,526 B1 7/2002 Banno
(Continued)

FOREIGN PATENT DOCUMENTS

CN 107733473 A 2/2018
CN 107800472 A 3/2018
(Continued)

OTHER PUBLICATIONS

Ericsson, "Remaining Issues on Beam Recovery," 3GPP TSG RAN WG1 Meeting #92bis, R1-1804975, Sanya, China, Apr. 16-20, 2018, 9 pages.
(Continued)

*Primary Examiner* — John D Blanton
(74) *Attorney, Agent, or Firm* — Fish & Richardson P.C.

(57) ABSTRACT

The present disclosure relates to network switching methods and apparatuses. In one example method, a beam that currently provides a service for a terminal device is a first beam. The first beam is generated by a first network device. The first network device obtains user information of the terminal device, and obtains switching information based on the user information. After the first network device sends the switching information to the terminal device, the terminal device can perform beam switching based on the switching information.

17 Claims, 10 Drawing Sheets

(58) Field of Classification Search
CPC .............. H04B 7/2041; H04B 7/18519; H04B 7/18515
See application file for complete search history.

(56) References Cited

U.S. PATENT DOCUMENTS

| | | | |
|---|---|---|---|
| 10,506,483 B1* | 12/2019 | Williamson | H04B 7/18584 |
| 2014/0295752 A1 | 10/2014 | Dankberg | |
| 2016/0183234 A1 | 6/2016 | Sung et al. | |
| 2016/0323032 A1 | 11/2016 | Ulupinar et al. | |
| 2017/0238216 A1* | 8/2017 | Damnjanovic | H04W 36/0072 455/427 |
| 2019/0245614 A1* | 8/2019 | Lucky | H04B 7/2041 |
| 2020/0314914 A1* | 10/2020 | Roy | H04W 74/006 |
| 2022/0030532 A1* | 1/2022 | Hajir | H04B 7/18513 |
| 2024/0172066 A1* | 5/2024 | Hong | H04W 36/0058 |

FOREIGN PATENT DOCUMENTS

| | | |
|---|---|---|
| CN | 107852227 A | 3/2018 |
| CN | 107889145 A | 4/2018 |
| CN | 108702200 A | 10/2018 |
| CN | 109075853 A | 12/2018 |
| CN | 109391337 A | 2/2019 |
| CN | 109690973 A | 4/2019 |
| CN | 109842914 A | 6/2019 |
| WO | 2018052744 A2 | 3/2018 |
| WO | 2018127264 A1 | 7/2018 |

OTHER PUBLICATIONS

Huawei, "Mobility Issues in NTN," 3GPP TSG-RAN WG3 Meeting #102, R3-186694, Spokane, USA, Nov. 12-16, 2018, 3 pages.
MediaTek Inc., "Grouping and Automatic Reconfiguration for Handover Enhancement in LEO NTN," 3GPP TSG-RAN WG2 Meeting #106, Tdoc R2-1905702 (Revision of R2-1903062), Xi'an, China, May 13-17, 2019, 7 pages.
Office Action issued in Chinese Application No. 201911086384.2 on Nov. 17, 2021, 20 pages (with English translation).
PCT International Search Report and Written Opinion issued in International Application No. PCT/CN2020/120436 on Dec. 31, 2020, 14 pages (with English translation).
Extended European Search Report in European Appln No. 20885765.6, dated Oct. 25, 2022, 8 pages.

* cited by examiner

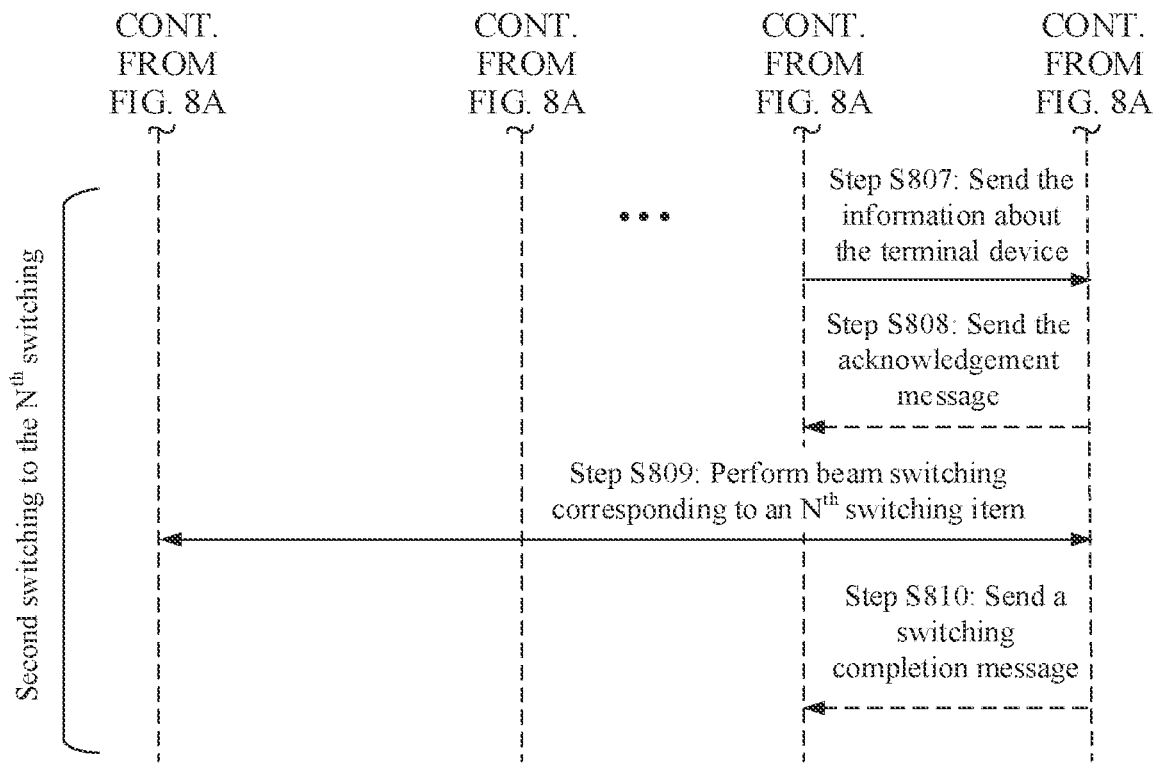

FIG. 8B

| A terminal device receives switching information sent by a first network device, where the switching information includes N switching items, any one of the switching items includes time information and an identifier of a second beam, the time information is used to indicate duration required by the terminal device to pass through a coverage area of the second beam corresponding to the any switching item, and N is a positive integer | S901 |

| The terminal device performs beam switching based on the switching information | S902 |

FIG. 9

NETWORK SWITCHING METHOD AND APPARATUS

CROSS-REFERENCE TO RELATED APPLICATIONS

This application is a continuation of International Patent Application No. PCT/CN2020/120436, filed on Oct. 12, 2020, which claims priority to Chinese Patent Application No. 201911086384.2, filed on Nov. 8, 2019. The disclosures of the aforementioned applications are hereby incorporated by reference in their entireties.

TECHNICAL FIELD

This application relates to communications technologies, and in particular, to a network switching method and an apparatus.

BACKGROUND

Satellite communication has advantages such as wide coverage, flexible networking, easy deployment and no geographical restriction. The advantages make satellite communication widely developed. A satellite communication scenario includes a low earth orbit (LEO) satellite system, a medium earth orbit (MEO) satellite system, a high earth orbit (HEO) satellite system, a geostationary earth orbit (GEO) satellite system, and the like. LEO satellites are more widely used because they are relatively close to the earth surface and have relatively short propagation delays and relatively small path losses. In the LEO satellite system, due to high-speed movement of the LEO satellites, a user equipment (UE) needs to frequently switch between different satellite beams, to ensure service continuity. For example, in an LEO 600 km satellite service, duration of the UE in a coverage area of a beam may be less than 3 s.

In the conventional technology, for example, as shown in FIG. 1, a possible solution in which UE implements beam switching in the LEO satellite system is as follows: A LEO satellite sends one or more beams (four beams in FIG. 1) that include channel state information reference signals (CSI-RS); the UE measures the CSI-RSs to obtain a plurality of (four in FIG. 1) reference signal received powers (RSRP); the UE reports a signal quality measurement result to the LEO satellite, and the LEO satellite selects, based on the received quality measurement result, a beam corresponding to a CSI-RS with the strongest RSRP to perform downlink channel transmission; and when the RSRP measured by the UE on a serving beam is lower than a threshold, the LEO satellite informs the UE of new beam information, to complete inter-beam switching.

However, in the conventional technology, signaling overheads of a method for implementing beam switching by the UE in the LEO satellite system are high, affecting use efficiency.

SUMMARY

Embodiments of this application provide a network switching method and an apparatus, to reduce signaling overheads caused by beam switching in satellite communication.

According to a first aspect, an embodiment of this application provides a network switching method. A terminal device receives switching information sent by a first network device, where the switching information includes N switching items, and any one of the switching items includes time information and an identifier of a second beam, where the time information is used to indicate duration required by the terminal device to pass through a coverage area of the second beam corresponding to the any switching item, and N is a positive integer. The terminal device performs beam switching based on the switching information. In this embodiment of this application, a beam that currently provides a service for the terminal device is a first beam. The first beam is generated by the first network device. The first network device obtains user information of the terminal device, and further the first network device can obtain the switching information based on the user information and the like, so that after the first network device sends the switching information to the terminal device, the terminal device can perform beam switching based on the switching information. In this beam switching, procedures such as measurement, reporting the user information, and receiving switched beams allocated by the network device, as in the conventional technology do not need to be performed. Therefore, signaling procedures and overheads of the network can be reduced, so that a switching response time can be reduced.

Optionally, N is 1, When N is 1, it is equivalent to that only the next beam switching is predicted for the terminal device. Because the track of the terminal device usually does not deviate greatly within a relatively short time, relatively accurate switching information can be usually obtained when N is 1, so that the terminal device can implement beam switching with relatively high accuracy.

Optionally, N is an integer greater than or equal to 2, and that the terminal device performs beam switching based on the switching information includes: The terminal device performs beam switching for successive N times based on the switching information. In this way, the terminal device can implement beam switching for successive N times based on the switching information, so that signaling overheads can be greatly reduced.

Optionally, that the terminal device performs beam switching based on the switching information includes: For a first switching item in the N switching items, the terminal device switches, at a start moment corresponding to the first switching item, to a second beam corresponding to the first switching item. Because the terminal device can switch to the second beam corresponding to the first switching item at a start moment corresponding to the first switching item, and does not need to perform procedures such as measurement, reporting the user information, and receiving switched beams allocated by the network device, signaling overheads in beam switching can be greatly reduced.

Optionally, the switching information is obtained based on user information of the terminal device and movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of the first beam, Optionally, the movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N. A higher speed at which the terminal device leaves the coverage area of the first beam indicates a higher probability that a movement track of the terminal device deviates from a predicted movement track with time. Therefore, a relatively small value of N may be set, to obtain relatively accurate switching information.

Optionally, the N switching items include a second switching item, and a second beam corresponding to the second switching item is generated by a second network device. That the terminal device performs beam switching for successive N times based on the switching information includes: For the second switching item, the terminal device measures, within a time corresponding to the second switching item, signal quality of the terminal device in the second beam corresponding to the second switching item the terminal device sends a switching request to the second network device when the signal quality is greater than a threshold; and the terminal device receives a switching response message sent by the second network device and switches to the second beam corresponding to the second switching item. In this way, the terminal device switches to the second beam corresponding to the first switching item only when signal quality in the second beam corresponding to the first switching item is relatively good, so that the second beam has relatively good signal quality after the terminal device switches to the second beam corresponding to the first switching item.

Optionally, the method further includes: The terminal device sends the user information of the terminal device to the first network device.

According to a second aspect, an embodiment of this application provides a network switching method. A first network device obtains user information of a terminal device within a coverage area of a first beam. The first network device sends switching information to the terminal device, where the switching information includes N switching items, and any one of the switching items includes time information and an identifier of a second beam, where the time information is used to indicate duration required by the terminal device to pass through a coverage area of the second beam corresponding to the any switching item, the switching information is used to indicate the terminal device to perform beam switching, and N is a positive integer.

Optionally, N is 1.

Optionally, N is an integer greater than or equal to 2, and that the terminal device performs beam switching based on the switching information includes: The terminal device performs beam switching for successive N times based on the switching information.

Optionally, for a first switching item in the N switching items, the first network device switches, at a start moment corresponding to the first switching item, the terminal device to a second beam corresponding to the first switching item.

Optionally, the switching information is obtained based on user information of the terminal device and movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam.

Optionally, the movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. The method further includes: The first network device sends a message including information about the terminal device to the second network device, where the message is used for the second network device to reserve a resource for the terminal device within a time corresponding to the second switching item.

Optionally, the terminal device belongs to a first group, the first group includes a plurality of terminal devices, and the terminal devices in the first group receive same switching information sent by the first network device.

Optionally, the method further includes: The first network device receives the user information of the terminal device that is sent by the terminal device.

According to a third aspect, an embodiment of this application provides a network switching method. A first network device receives user information of a terminal device, where the terminal device is currently located in a coverage area of a first beam; the first network device sends switching information to the terminal device, where the switching information includes N switching items, and any one of the switching items includes time information and an identifier of a second beam, where the time information is used to indicate duration required by the terminal device to pass through a coverage area of the second beam corresponding to the any switching item, and N is a positive integer; and the terminal device performs beam switching based on the switching information.

According to a fourth aspect, an embodiment of this application provides a terminal device, including: a receiving module, configured to receive switching information sent by a first network device, where the switching information includes N switching items, and any one of the switching items includes time information and an identifier of a second beam, where the time information is used to indicate duration required by the terminal device to pass through a coverage area of the second beam corresponding to the any switching item, and N is a positive integer; and a processing module, configured to perform beam switching based on the switching information.

Optionally, N is 1.

Optionally, N is an integer greater than or equal to 2, and the processing module is specifically configured to perform beam switching for successive N times based on the switching information.

Optionally, the processing module is further specifically configured to: for a first switching item in the N switching items, switch, at a start moment corresponding to the first switching item, to a second beam corresponding to the first switching item.

Optionally, the switching information is obtained based on user information of the terminal device and/or movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam. The movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. The processing module is further specifically configured to: for the second switching item, measure, within a time corresponding to the second switching item, signal quality of the terminal device in the second beam corresponding to the second switching item; send a switching request to the second network device when the signal quality is greater than a threshold; and receive a switching response message sent by the second network device and switch to the second beam corresponding to the second switching item.

According to a fifth aspect, an embodiment of this application provides a first network device, including: a processing module, configured to obtain user information of a terminal device within a coverage area of a first beam; and a sending module, configured to send switching information to the terminal device, where the switching information includes N switching items, and any one of the switching items includes time information and an identifier of a second beam, where the time information is used to indicate duration required by the terminal device to pass through a coverage area of the second beam corresponding to the any switching item, the switching information is used to indicate the terminal device to perform beam switching, and N is a positive integer.

Optionally, N is 1.

Optionally, N is an integer greater than or equal to 2, and the switching information is used to indicate the terminal device to perform beam switching for successive N times.

Optionally, the processing module is further configured to: for a first switching item in the N switching items, switch, at a start moment corresponding to the first switching item, the terminal device to a second beam corresponding to the first switching item.

Optionally, the terminal device belongs to a first group, the first group includes a plurality of terminal devices, and the terminal devices in the first group receive same switching information sent by the first network device.

Optionally, the switching information is obtained based on the user information and/or movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of the first beam. The movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. The sending module is further configured to send a message including information about the terminal device to the second network device, where the message is used for the second network device to reserve a resource for the terminal device within a time corresponding to the second switching item.

According to a sixth aspect, an embodiment of this application provides a communications apparatus, including a processor and a communications interface, where the communications interface is configured to: receive to-be-processed data and output processed data, and the processor is configured to perform the method in the first aspect or any optional implementation of the first aspect on the to-be-processed data.

Optionally, the communications apparatus further includes a memory, configured to store program instructions, and when the program instructions are executed by the processor, the method in the first aspect or any optional implementation of the first aspect is performed.

According to a seventh aspect, an embodiment of this application provides a communications apparatus, including a processor and a communications interface, where the communications interface is configured to: receive to-be-processed data and output processed data, and the processor is configured to perform the method in the second aspect or any optional implementation of the second aspect on the to-be-processed data.

Optionally, the communications apparatus further includes a memory, configured to store program instructions, and when the program instructions are executed by the processor, the method in the second aspect or any optional implementation of the second aspect is performed.

According to an eighth aspect, an embodiment of this application provides a communications apparatus, including a logic circuit, an input interface, and an output interface, where the input interface is configured to obtain to-be-processed data; the logic circuit is configured to perform the method in the first aspect or any optional implementation of the first aspect on the to-be-processed data, to obtain the processed data; and the output interface is configured to output the processed data.

According to a ninth aspect, an embodiment of this application provides a communications apparatus, including a logic circuit, an input interface, and an output interface, where the input interface is configured to obtain to-be-processed data; the logic circuit is configured to perform the method in the second aspect or any optional implementation of the second aspect on the to-be-processed data, to obtain the processed data; and the output interface is configured to output the processed data.

According to a tenth aspect, an embodiment of this application provides a chip, including the communications apparatus in the sixth aspect or any optional implementation of the sixth aspect.

According to an eleventh aspect, an embodiment of this application provides a chip, including the communications apparatus in the seventh aspect or any optional implementation of the seventh aspect.

According to a twelfth aspect, an embodiment of this application provides a chip, including the communications apparatus in the eighth aspect.

According to a thirteenth aspect, an embodiment of this application provides a chip, including the communications apparatus in the ninth aspect.

According to a fourteenth aspect, an embodiment of this application provides a computer-readable storage medium, where the computer-readable storage medium is configured to store computer programs, and the computer programs are configured to implement the method in the first aspect or any optional implementation of the first aspect.

According to a fifteenth aspect, an embodiment of this application provides a computer-readable storage medium, where the computer-readable storage medium is configured to store computer programs, and the computer programs are configured to implement the method in the second aspect or any optional implementation of the second aspect.

According to a sixteenth aspect, an embodiment of this application provides a communications system, including the terminal device in the fourth aspect and the corresponding feasible implementations of the fourth aspect and the first network device in the fifth aspect and the corresponding feasible implementations of the fifth aspect.

It should be understood that technical solutions in the second to the sixteenth aspects of embodiments of this application are consistent with technical solutions in the first aspect of embodiments of this application, and beneficial effects achieved by the aspects and corresponding feasible implementations are similar. Details are not described again.

BRIEF DESCRIPTION OF DRAWINGS

FIG. 8A and FIG. 8B are a schematic flowchart of signaling exchange of another network switching method according to an embodiment of this application;

FIG. 9 is a schematic flowchart of a network switching method according to an embodiment of this application;

DESCRIPTION OF EMBODIMENTS

Embodiments of this application provide a network switching method. The method the embodiments of this application may be applied to long term evolution (LTE), or a 5th generation (5G) system, or a future mobile communications system.

Figure 1:
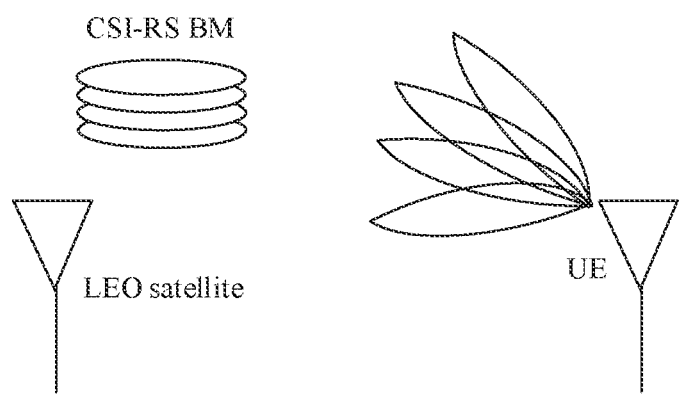
FIG. 1 is a schematic diagram of a scenario in which UE implements beam switching in an LEO satellite system.
Figure 2:
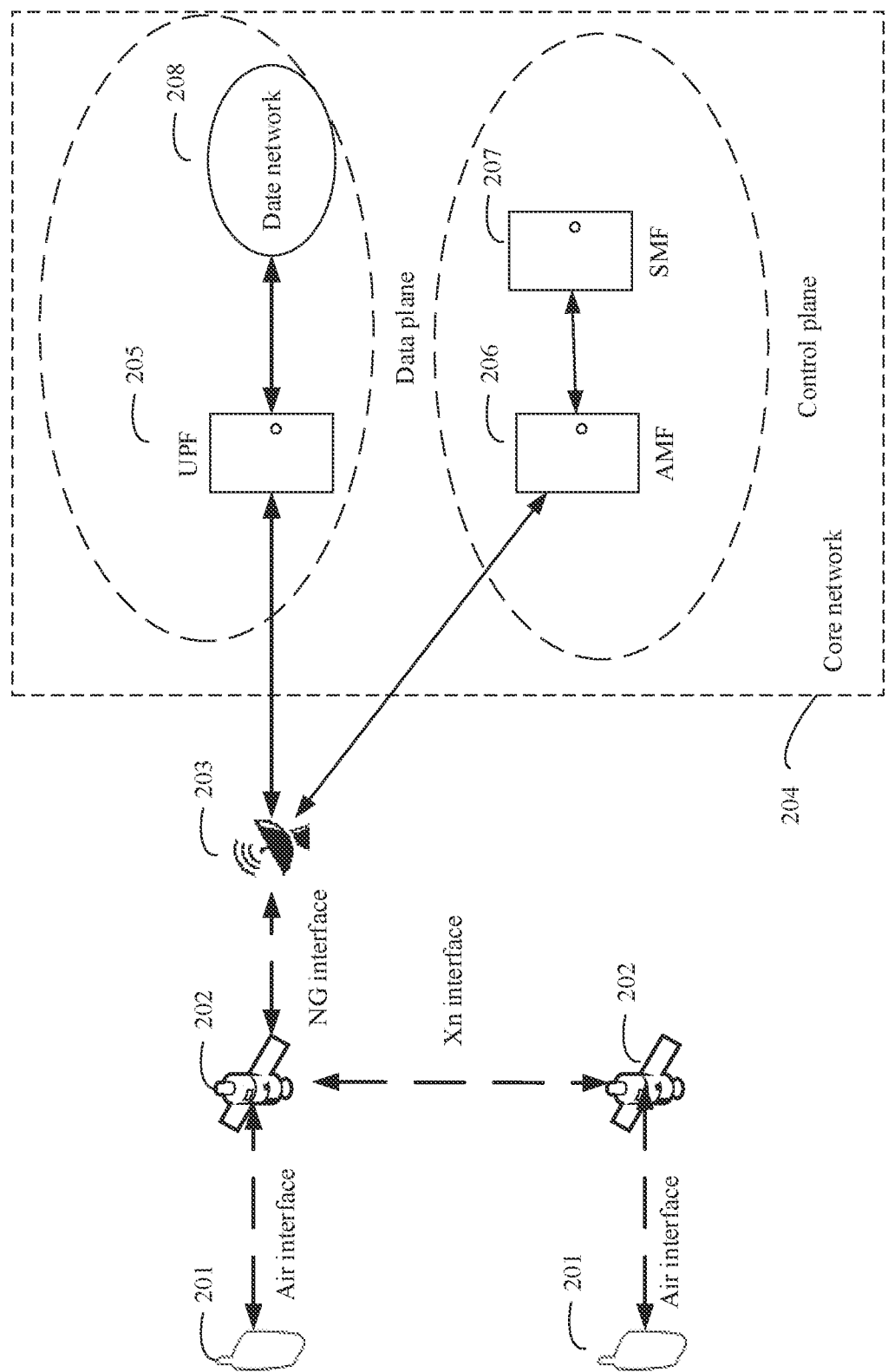
FIG. 2 is a schematic diagram of a 5G network architecture.

FIG. 2 is a schematic diagram of a typical network architecture of a satellite communications system. As shown in FIG. 2, the satellite communications system includes a terminal device 201, a satellite base station 202, a ground station 203, and a core network 204. The core network 204 mainly includes a user plane function (UPF) unit 205, an access and mobility management function (AMF) unit 206, a session management function (SMF) unit 207, and a data network (DN) 208. The terminal device 201 communicates with the satellite base station 202 by accessing a network through an air interface, and the satellite base station 202 is connected to the core network 204 on the ground through a radio link (for example, a next generation (NG) network interface). In addition, there is also a radio link between the satellite base stations 202, and signaling exchange and user data transmission between the satellite base stations are completed through an Xn interface. Network elements and interfaces shown in FIG. 2 are described below.

The terminal device 201 in this embodiment of this application may be referred to as user equipment (UE), an access terminal, a subscriber unit, a subscriber station, a mobile station, a mobile platform, a remote station, a remote terminal, a mobile device, a user terminal, a terminal, a wireless communications device, a user agent, or a user apparatus. The terminal device 201 may access a satellite network through the air interface and initiate a service such as a call or going online on the Internet, and the terminal device 201 may be a mobile device that supports 5G new radio (NR). Typically, the terminal device 201 may be a mobile phone, a tablet computer, a portable notebook computer, a virtual/mixed/augmented reality device, a navigation device, a ground base station (for example, a new radio NodeB (NR NodeB, gNB)), a ground station (GS), a session initiation protocol (SIP) phone, a wireless local loop (WLL) station, a personal digital assistant (PDA), a handheld device having a satellite communications function, a computing device, another processing device connected to a wireless modem, a vehicle-mounted device, a wearable device, a terminal device in a 5G network, a terminal device in a future evolved public land mobile network (PLMN) or another future communications system, or the like.

The satellite base station 202 mainly provides a wireless access service for the terminal device 201, schedules a radio resource for the terminal device accessing the satellite base station, and provides a reliable wireless transmission protocol, a data encryption protocol, and the like. The satellite base station is a base station that uses an artificial earth satellite, a high altitude aircraft, or the like for wireless communications, for example, an evolved base station and a 5G base station. The satellite base station may be a non-geostationary satellite orbit such as a medium earth orbit MEO satellite or a LEO satellite, may be a high altitude platform station (RAPS), or the like.

In embodiments of this application, the ground station 203 is mainly responsible for forwarding signaling and service data between the satellite base station 202 and the core network 204. The ground station is usually a ground device that is disposed on the surface of the earth (including being disposed on a ship or an airplane) to perform artificial satellite communication. The ground station mainly includes a high-gain antenna system that can trace an artificial satellite, a high-power microwave transmission system, a low-noise receiving system, a power supply system, and the like.

The core network (CN) 204 is mainly used for user access control, charging, mobility management, session management, user security authentication, a supplementary service, and the like. In embodiments of this application, the core network 204 mainly includes the user plane function unit 205, the access and mobility management function unit 206, the session management function unit 207, and the data network 208. The AMF network element is mainly responsible for services such as mobility management, and access management. The SMF network element is mainly responsible for session management, a dynamic host configuration protocol function, user plane function selection and control, and the like. The UPF network element is mainly responsible for functions related to external connection to the data network, user plane data packet routing and forwarding, packet filtering, quality of service (QoS) control, and the like. It should be noted that these function units may independently work, or may be combined to implement some control functions, such as access control and mobility management functions such as access authentication, security encryption, and location registration of the terminal device, and session management functions such as establishment, release, and change of a user plane transmission path. The core network further includes other function units, which are not described one by one herein.

Figure 3:
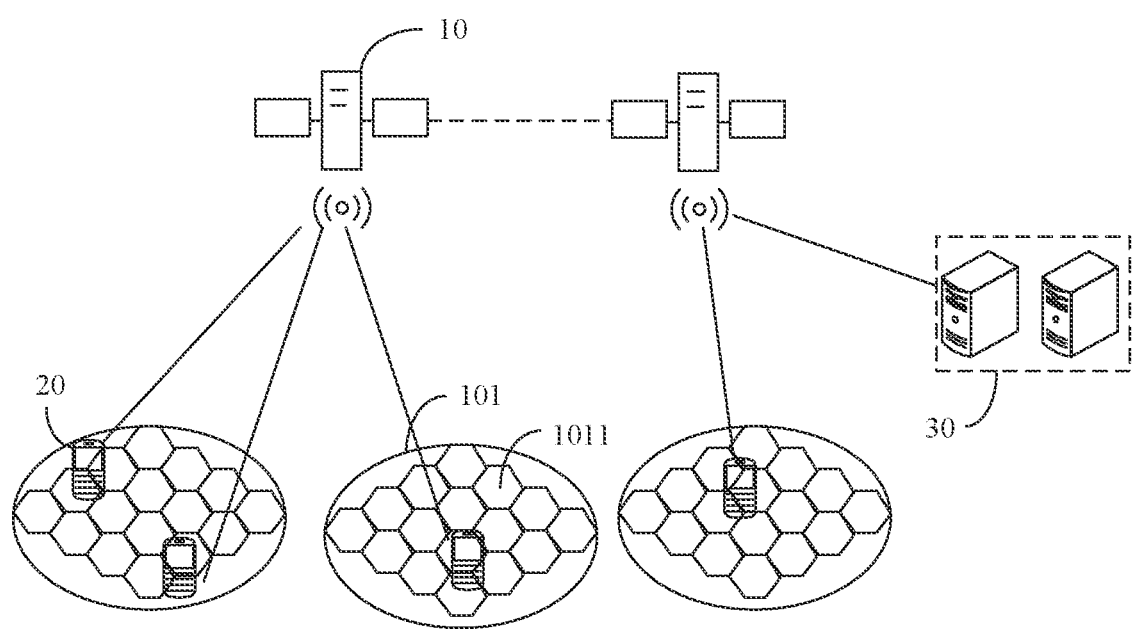
FIG. 3 is a schematic diagram of an application scenario of a network switching method according to an embodiment of this application.

For example, FIG. 3 is a schematic diagram of an application scenario in which a network switching method according to an embodiment of this application is applied to a 5G mobile satellite communications system.

A satellite 10 may provide a communications service for a terminal device 20, and the satellite 10 may further be connected to a core network device 30 (where the core network device 30 may include the ground station in the foregoing typical architecture, or may include a network element that can implement a function of forwarding service data and signaling that are of a satellite base station or a core network). Each satellite 10 may serve a plurality of cells 101. Each cell 101 may correspond to one or more beams 1011. Each beam has a corresponding beam identifier, and each beam identifier may be used to uniquely identify the beam. The terminal device 20 may implement switching between different beams.

In embodiments of this application, a method on a terminal device side may be performed by the terminal device, or may be performed by an apparatus in the terminal device (where it should be noted that the terminal device is used as an example for description in embodiments provided in this application). For example, the apparatus in the terminal device may be a chip system, a circuit, or a module. This is not limited in this application.

In embodiments of this application, a method on a first network device side may be performed by a first network device, or may be performed by an apparatus in a first network device. For example, the apparatus in the first network device may be a chip system, a circuit, or a module. This is not limited in this application.

The terminal device in embodiments of this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOs operating system, or a Windows operating system. The application layer includes applications such as a browser, an address book, word processing software, and instant messaging software.

The first network device in embodiments of this application may be a satellite, a base station, a transmission reception point (TRP), a core network device, or the like.

A first beam in the embodiments of this application may be a beam that currently provides a service for the terminal device, and the first network device provides a service for the first beam.

A second beam in the embodiments of this application may be a next configurable beam that the terminal device may switch a connection to (namely, a next beam to switch to), and the first network device or a second network device may provide a service for the second beam. It may be understood that, the second beam is a relative concept. After the terminal device switches to the second beam, the second beam becomes a beam that currently provides a service, and the next beam to switch to of the original second beam becomes the current second beam, and so on in the switching process.

Beam switching in the embodiments of this application may be that a mobile terminal switches a connection from a current serving beam to a next beam to switch to, to implement switching from the serving beam to the configurable beam.

Beam switching for successive N times in embodiments of this application may be a process in which the terminal device sequentially performs switching from the first time to the $N^{th}$ time within a period of time. It may be understood that if the terminal device fails in switching in any one of the N times of switching within the period of time, a process of the successive switching this time ends.

By using specific embodiments, the following describes in detail the technical solutions of this application and how to resolve the foregoing technical problem by using the technical solutions of this application. The following specific embodiments may be implemented independently, or may be combined with each other. For a same or similar concept or process, details may not be described again in some embodiments.

Figure 4:
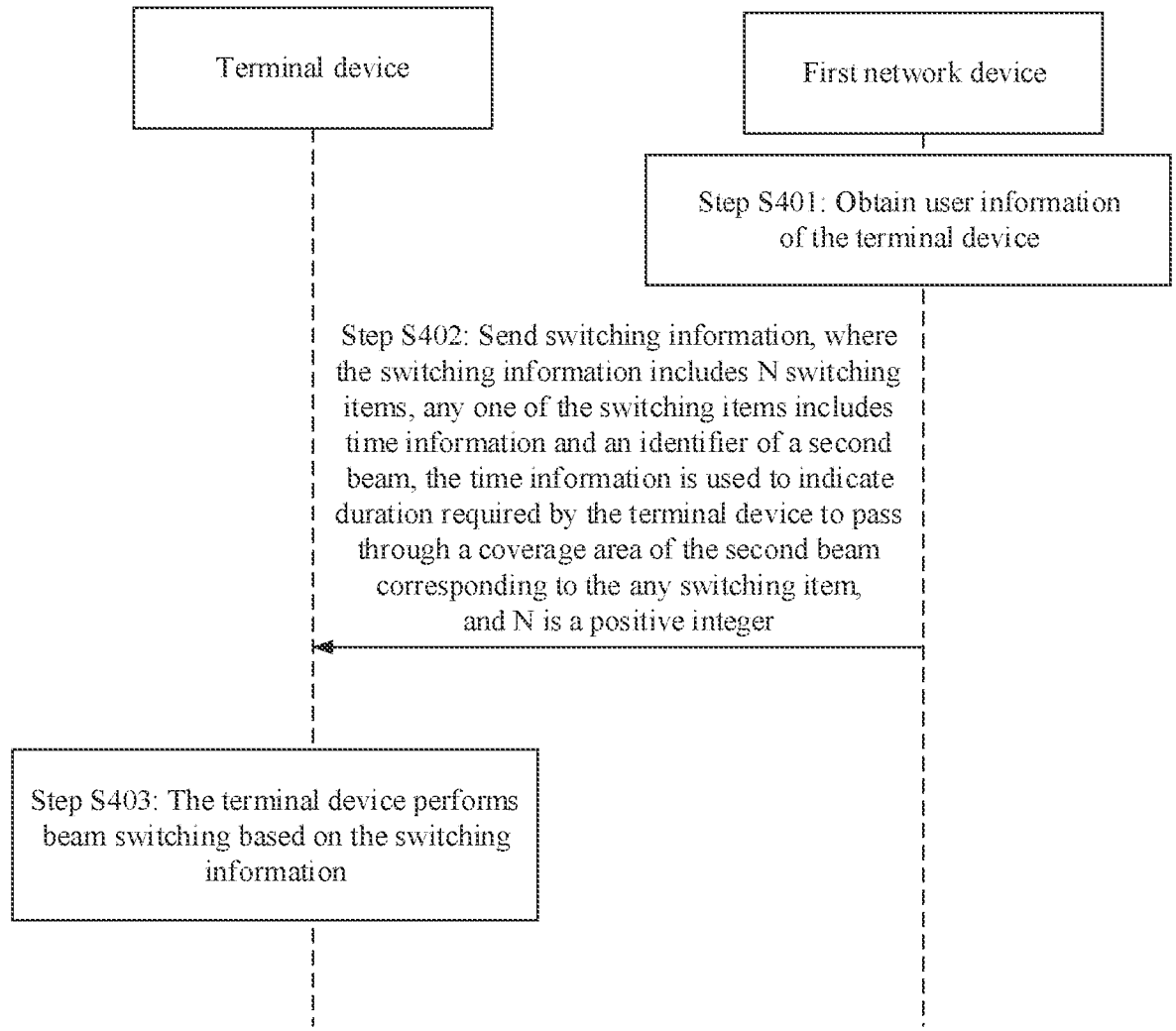
FIG. 4 is a schematic flowchart of signaling exchange of a network switching method according to an embodiment of this application.

FIG. 4 is a schematic flowchart of signaling exchange of a network switching method according to an embodiment of this application. As shown in FIG. 4, signaling exchange of the method provided in this embodiment may include the following steps.

Step S401: A first network device obtains user information of a terminal device, where the terminal device is currently located in a coverage area of a first beam.

The first network device in this embodiment of this application is a network device that provides a service for the first beam, or a network device that generates the first beam. The terminal device is located in the coverage area of the first beam, or it may be understood that a beam that the terminal device already accesses is the first beam.

The user information of the terminal device may be information that can be used to reflect a movement track of the terminal device relative to the first network device in a future time period. For example, the user information may be information related to a location of the terminal device, or other information determined based on an actual application scenario. The user information is not specifically limited in this embodiment of this application.

In a possible implementation, the first network device may obtain the user information of the terminal device located in a first beam range by using any positioning system such as a global navigation satellite system (GNSS), a global positioning system (GPS), or a Beidou system.

In another possible implementation, the first network device may receive the user information of the terminal device that is sent by the terminal device. For example, the terminal device may periodically send the user information to the first network device. Alternatively, when meeting a condition of sending the user information, the terminal device triggers to send the user information of the terminal device to the first network device, so that the first network device can obtain the user information of the terminal device. Alternatively, the first network device may send a specific measurement configuration item to the terminal device by using a measurement configuration message. After receiving the measurement configuration message, the terminal device may measure the user information of the terminal device, and feed back, by using a measurement report message, measurement report information including the user information of the terminal device to the first network device.

It may be understood that, the first network device may alternatively obtain the user information of the terminal device in any manner based on an actual application scenario. This is not specifically limited in this embodiment of this application.

Step S402: The first network device sends switching information to the terminal device, where the switching information includes N switching items, and any one of the switching items includes time information and an identifier of a second beam, where the time information is used to indicate duration required by the terminal device to pass through a coverage area of the second beam corresponding to the any switching item, and N is a positive integer.

In this embodiment of this application, the switching information may be obtained by the first network device by predicting the movement track of the terminal device relative to the first network device in a future time. The switching information is used to indicate the terminal device to perform beam switching for N times, and N is a positive integer. It may be understood that, the switching information is used only to indicate the terminal device to perform beam switching. During actual application, the terminal device may determine a specific quantity of times of switching based on an actual application scenario. For example, the terminal device may perform complete beam switching for N times based on an indication of the switching information. The terminal device may alternatively perform beam switching only for a quantity of times less than N, for example, for N−1 times or N−2 times after receiving the switching information, A specific value of N may be determined based on an actual application scenario. This is not specifically limited in this embodiment of this application.

In a possible implementation, the switching information may be calculated by the first network device based on the user information of the terminal device and the movement information of the first network device. The movement information of the first network device may be used to feed back a movement track of a satellite. For example, when the first network device is a satellite, the movement information of the first network device is movement information of the satellite.

Figure 5:
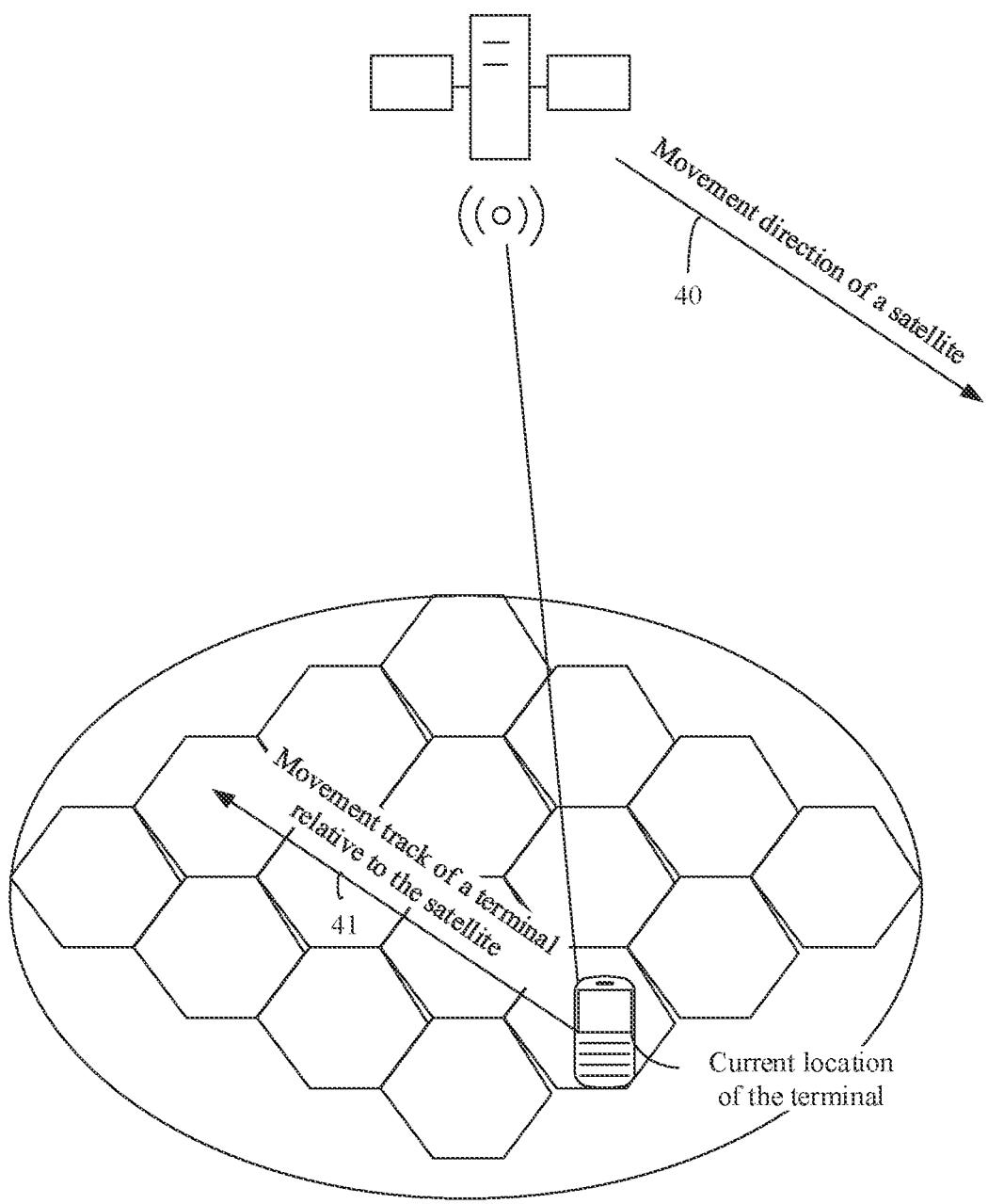
FIG. 5 is a schematic diagram of a movement track of a terminal device in a plurality of beams according to an embodiment of this application.

For example, as shown in FIG. 5, a track 40 is a track of a movement direction of the satellite. When a speed of the terminal device relative to ground is relatively low, compared with the satellite, the terminal device may be considered to be in a stationary state. Therefore, as shown in FIG. 5, the movement track of the terminal device relative to the first network device in a future time may be a track 41 in a direction opposite to that of the track 40. The track 41 may pass through coverage areas of a plurality of beams. Therefore, it may be predicted that the terminal device performs beam switching in beams that the terminal device may pass through in future. Each beam that the terminal may pass through in future is collectively referred to as the second beam. Adaptively, the switching information including the N switching items may be obtained. Any switching item in the switching information includes the identifier of the second beam and the duration required by the terminal device to pass through the coverage area of the second beam corresponding to the any switching item.

It may be understood that, if the speed of the terminal device relative to ground is relatively high, for example, the terminal device is disposed in a device that moves quickly, for example, an airplane or a high-speed train, a movement speed and a movement direction of the terminal device may affect the movement track of the terminal device relative to the first network device. Therefore, the movement track of the terminal device relative to the first network device in the future time may be further predicted based on the movement speed and the movement direction of the terminal device and a movement condition of the first network device, to further obtain adaptive switching information. This is not specifically limited in this embodiment of this application.

In this embodiment of this application, N may be 1, and the terminal device may implement beam switching once based on the switching information. In the beam switching, because the switching information includes the identifier of the second beam that the terminal device is to switch to, the terminal device does not need to perform procedures such as measurement, reporting the user information, and selecting a target switched beam with the first network device. Therefore, signaling overheads can be reduced. It may be understood that, when N is 1, it is equivalent to that only the next beam switching is predicted for the terminal device. Because the track of the terminal device usually does not deviate greatly within a relatively short time, relatively accurate switching information can be usually obtained when N is 1, so that the terminal device can implement beam switching with relatively high accuracy.

In this embodiment of this application, N may alternatively be a positive integer greater than or equal to 2, and the terminal device can implement beam switching for successive N times based on the switching information, so that signaling overheads can be greatly reduced. An actual value of N may be determined based on an actual application scenario. For example, when the speed of the terminal device relative to ground is relatively low, adaptively, the value of N may be relatively large: or when the speed of the terminal device relative to ground is relatively high, the value of N is relatively small, or a higher speed at which the terminal device leaves the coverage area of the first beam indicates a smaller value of N, or the like. This is not specifically limited in this embodiment of this application.

For example, a manner of determining the value of N is as follows: A sum of time information in the N switching items is less than a threshold value ThresholdOfTimeTotal. To be specific, total duration in which the terminal passes through coverage areas of N second beams cannot exceed ThresholdOfTimeTotal. ThresholdOfTimeTotal may be determined based on the movement speed of the terminal device relative to ground or the speed at which the terminal device leaves the coverage area of the first beam.

During actual application, the movement speed and direction of the terminal device may change continuously. However, for a simplified solution, in this embodiment of this application, the value of N may be calculated based on an instantaneous value of the movement speed of the terminal device. For example, if the movement speed of the terminal is TerminalMovingSpeed, and a maximum value of an offset that is of a movement track of the terminal device and that is brought by the movement speed of the terminal device is TrialOffsetMax, a time required for generating TrialOffsetMax is ThresholdOfTimeTotal. For example, a relationship among the three may meet the following formula:

$$\text{ThresholdOfTimeTotal} = \frac{\text{TrialOffsetMax}}{\text{TerminalMovingSpeed}}$$

For example, if TrialOffsetMax is 500 m, and the movement speed of the terminal is 20 km/h. ThresholdOffTimeTotal is 90 s. In this case, the first network device may further determine, based on ThresholdOfTimeTotal, the value of N of the switching item delivered to the terminal device.

In this embodiment of this application, each switching item may correspond to one beam switching of the terminal device. The identifier of the second beam corresponding to the switching item may be in a one-to-one correspondence with the second beam, and the second beam may be mapped to by using the identifier of the second beam. The time information corresponding to the switching item is related to the coverage area of the second beam and the speed of the terminal device.

For example, the identifier of the second beam may be an identifier related to an identifier of a cell in which the second beam is located and a number of the second beam in the cell. For example, as shown in Table 1, a manner of representing the switching information is shown. Each row may represent one switching item, a cell ID is the identifier of the cell in which the second beam is located, a beam ID is the number of the second beam in the cell, a combination of the cell ID and the beam ID may be used as the identifier of the second beam, and time is the time information.

TABLE 1

| cell ID | beam ID | time(s) |
|---------|---------|---------|
| 0 | 0 | 2 |
| 0 | 1 | 3 |
| 1 | 0 | 1.5 |
| ... | ... | ... |

One cell may have one or more beams. The beam ID in each cell is defined as a sequence number of the beam in the cell. For example, the beam ID may be defined starting from 0 in each cell. For example, the beam ID of a cell ID 0 is to n−1, and the identifier of the beam may be a combination of the cell ID 0 and sequence numbers 0 to n−1. If the beam ID of a cell ID 1 is 0 to n−1, the identifier of the beam may be a combination of the cell ID 1 and the sequence numbers 0 to n−1.

Alternatively, in another possible implementation, the identifier of the second beam may be represented in a manner such as a sequence number. For example, all beams may be defined in sequence starting from 0. For example, the beam ID of the cell ID 0 is 0 to n−1 and the beam ID of the cell ID 1 is n to 2n−1. A specific form of the identifier of the second beam is not limited in this embodiment of this application.

Step S403: The terminal device performs beam switching based on the switching information.

In this embodiment of this application, the terminal device may perform beam switching based on each switching item in the switching information. It should be noted that, the second beams in the N switching items may all belong to a range served by the first network device, or may separately belong to ranges served by a plurality of network devices (for example, a second network device and a third network device). When performing beam switching, the terminal device may separately communicate with the network device served by the second beam, to implement a beam switching process.

In a first possible implementation, the second beams in the N switching items may all belong to the range served by the first network device.

For example, that the terminal device performs beam switching based on the switching information may include: For a first switching item in the N switching items, the terminal device switches, at a start moment corresponding to the first switching item, to a second beam corresponding to the first switching item. Adaptively, the first network device switches, at the start moment corresponding to the first switching item, the terminal device to the second beam corresponding to the first switching item, to implement switching of the terminal device in the second beam corresponding to the first switching item.

It should be noted that, in this embodiment of this application, the first switching item may be any switching item in the N switching items. For ease of description, a concept of the first switching item is introduced herein, and the first switching item has no special meaning.

In this embodiment of this application, the start moment corresponding to the first switching item may be obtained based on a moment at which the terminal device starts to perform switching for the first time and time information of a switching item that is in the N switching items and that is before the first switching item. For example, the switching items in Table 1 are used as examples. When the terminal device performs beam switching corresponding to cell ID 0 beam ID 1, 2 s (time information of the cell ID 0 beam ID 0) may be added to a moment at which the terminal starts to perform switching for the first time, to obtain a start moment of the switching item corresponding to the cell ID 0 beam ID 1. When the terminal device performs beam switching corresponding to cell ID 1 beam ID 0, (2 s+3 s) (that is, time information of the cell ID 0 beam ID 0+time information of the cell ID 0 beam ID 1) may be added to the moment at which the terminal starts to perform switching for the first time, to obtain a start moment of the switching item corresponding to the cell ID 1 beam ID 0, and so on. Details are not described herein again.

It should be noted that, in this embodiment of this application, the moment at which the terminal device starts to perform switching for the first time may be related to duration in which the terminal device leaves the coverage area of the first beam. For example, the duration in which the terminal device leaves the coverage area of the first beam may be calculated based on a location of the terminal device in the coverage area of the first beam when the terminal device receives the switching information and the speed and direction of the terminal device relative to the first network device. Therefore, the terminal device may add, to the moment at which the switching information is received, the duration in which the terminal device leaves the coverage area of the first beam, to obtain the moment at which the terminal device starts to perform switching for the first time. Alternatively, when obtaining the user information of the terminal device, the first network device further calculates the duration required by the terminal device to leave the coverage area of the first beam, and when sending the switching information to the terminal device, the first network device further sends the duration required by the terminal device to leave the coverage area of the first beam to the terminal device. In this way, the terminal device may obtain, based on the duration that is required by the terminal device to leave the coverage area of the first beam and that is received from the first network device and further in combination with the moment at which the switching information is received, the moment at which the terminal device starts to perform switching for the first time.

Adaptively, the first network device may add, based on the moment at which the switching information is sent to the terminal device, the duration in which the terminal device leaves the coverage area of the first beam, to obtain the moment at which the first network device starts to perform switching for the first time. Further, the start moment corresponding to the second switching item, the start moment corresponding to an $N^{th}$ switching item, and the like are determined in a manner similar to that of the terminal device. Details are not described herein again.

It may be understood that, during specific application, based on an actual application scenario, both the terminal device and the first network device may alternatively obtain, in any other manner, the start moment corresponding to the first switching item. For example, a definition of the time information in Table 1 may be changed to the switching moment or defined as a switching time difference relative to a current moment. Because principles are similar, this is not specifically limited in this embodiment of this application.

In this embodiment of this application, because the terminal device can switch to the second beam corresponding to the first switching item at a start moment corresponding to the first switching item, and does not need to perform procedures such as measurement, reporting the user information, and receiving switched beams allocated by the network device, signaling overheads in beam switching can be greatly reduced. It may be understood that, in this embodiment of this application, beam switching has a relatively high requirement on time information. Therefore, time information of each switching item with relatively high accuracy needs to be calculated.

Alternatively, for example, that the terminal device performs beam switching based on the switching information may include: For the first switching item, the terminal device measures, within time information corresponding to the first switching item, signal quality of the terminal device in the second beam corresponding to the first switching item; the terminal device sends a switching request to the first network device when the signal quality is greater than a threshold; and the terminal device receives a switching response message sent by the first network device, and switches to the second beam corresponding to the first switching item.

In this embodiment of this application, before performing beam switching corresponding to the first switching item, the terminal device first measures signal quality (for example, RSRP or reference signal received quality (RSRQ)) of the terminal device in the second beam corresponding to the first switching item. Further, when the signal quality is greater than the threshold, the switching request is sent to the first network device, and when the switching response message sent by the first network device is received, the terminal device switches to the second beam corresponding to the first switching item. To be specific, in this embodiment of this application, the terminal device switches to the second beam corresponding to the first switching item only when the signal quality in the second beam corresponding to the first switching item is relatively good, so that the second beam has relatively good signal quality after the terminal device switches to the second beam corresponding to the first switching item.

It may be understood that if the signal quality is less than or equal to the threshold, because beam switching cannot bring better signal quality, the terminal device may not initiate beam switching corresponding to the switching item, so that signaling resources can be greatly saved.

In a second possible implementation, the second beams in the N switching items may belong to the ranges served by the plurality of network devices tor example, the second network device and the third network device).

For example, for a second switching item in the N switching items, a network device serving the second beam corresponding to the second switching item is the second network device, and the second network device is a network device different from the first network device. In this case, the first network device may send a message including the information about the terminal device to the second network device, where the message is used for the second network device to reserve a resource for the terminal device within a time corresponding to the second switching item.

Figure 6:
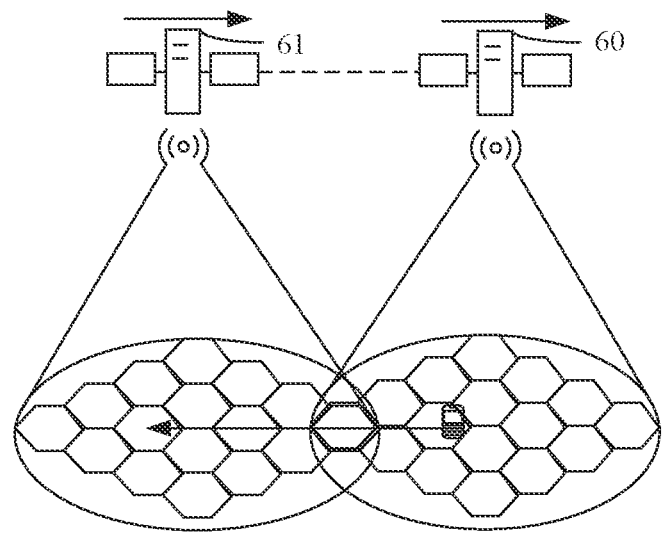
FIG. 6 is a schematic diagram of a movement track of another terminal device in a plurality of beams according to an embodiment of this application.

For example, FIG. 6 shows a schematic diagram in which the terminal device may perform beam switching in the second network device 61. The terminal device is currently located in a beam range of the first network device 60, and with movement of the first network device 60 and the second network device 61, the terminal device may be located in a beam range of the second network device 61 in a future time. When the first network device 60 configures the switching information for the terminal device, the switching information may include the second switching item. The second beam corresponding to the second switching item is generated by the second network device 61. In this case, the first network device 60 may send, to the second network device 61, the message including the information about the terminal device, where the information about the terminal device may be, for example, one or more of the following: current quality information QS of the terminal device, the user information of the terminal device, switching information, and the like. In this case, the second network device may reserve a resource for the terminal device within the time corresponding to the second switching item, and jointly implement beam switching corresponding to the second switching item with the terminal device.

For example, that the terminal device performs beam switching based on the switching information may include: The terminal device switches, at the start moment corresponding to the second switching item, to the second beam corresponding to the second switching item. Adaptively, the second network device switches, at the start moment corresponding to the second switching item, the terminal device to the second beam corresponding to the second switching item, to implement switching of the terminal device in the second beam corresponding to the second switching item. A manner of obtaining the start moment corresponding to the second switching item is similar to a manner of obtaining the start moment corresponding to the first switching item. Details are not described herein again.

For example, in another possible implementation, that the terminal device performs beam switching based on the switching information may include: For the second switching item, the terminal device measures, within a time corresponding to the second switching item, signal quality of the terminal device in the second beam corresponding to the second switching item; the terminal device sends a switching request to the second network device when the signal quality is greater than a threshold; and the terminal device receives a switching response message sent by the second network device and switches to the second beam corresponding to the second switching item.

In this embodiment of this application, before performing beam switching corresponding to the second switching item, the terminal device first measures signal quality (for example, RSRP or RSRQ) of the terminal device in the second beam corresponding to the second switching item. Further, when the signal quality is greater than the threshold, the switching request is sent to the second network device, and when the switching response message sent by the second network device is received, the terminal device switches to the second beam corresponding to the second switching item. To be specific, in this embodiment of this application, the terminal device switches to the second beam corresponding to the second switching item only when signal quality in the second beam corresponding to the second switching item is relatively good, so that the second beam has relatively good signal quality after the terminal device switches to the second beam corresponding to the second switching item.

It may be understood that if the signal quality is less than or equal to the threshold, because beam switching cannot bring better signal quality, the terminal device may not initiate beam switching corresponding to the switching item, so that signaling resources can be greatly saved.

It may be understood that, if there is a third switching item after the second switching item, and the second beam corresponding to the third switching item is generated by the third network device different from the second network device, the second network device may send the information about the terminal device to the third network device when the terminal device switches to the beam of the second network device, to further implement beam switching of the terminal device corresponding to the third switching item, and so on, so that the terminal device can implement switching in beams of a plurality of network devices.

It should be noted that, in an optional implementation, both the second switching item and the third switching item may be switching items the same as the first switching item. In this embodiment of this application, the first switching item, the second switching item, and the third switching item are merely used to distinguish different embodiments. This does not constitute a limitation on the switching item itself.

In addition, during specific application, if the terminal device fails in beam switching in any one of N times of beam switching, the terminal device may enter a process of reconfiguring the switching information, or after the terminal device completes the N times of beam switching, the terminal device may enter the process of reconfiguring the switching information. In addition, when the terminal device implements beam switching, the first network device may update a user list in the first network device. For example, when the terminal device switches to the second beam, the terminal device is deleted from the user list corresponding to the first beam, to implement a complete beam switching process. This is not specifically limited in this embodiment of this application.

Optionally, in step S402, the switching information is obtained based on the user information of the terminal device and/or movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam.

In this embodiment of this application, the geographical location information of the terminal device may be used to feed back a current location of the terminal device within the coverage area of the first beam.

The movement state information of the terminal device may be used to feed back that the terminal device is in a low-speed movement state or a high-speed movement state. A specific speed value of a low speed or a high speed may be set based on an actual application scenario. This is not specifically limited in this embodiment of this application. It may be understood that, a higher movement speed of the terminal device indicates a higher probability that a movement track of the terminal device deviates from a predicted movement track with time. Therefore, a relatively small value of N may be set. A lower movement speed of the terminal device indicates a higher probability that the movement track of the terminal device conforms to the predicted movement track in a relatively long time period. Therefore, a relatively large value of N may be set.

Alternatively, movement state information of the terminal device may be used to feed back the movement direction of the terminal device relative to the first network device. It may be understood that the movement direction of the terminal device relative to the first network device may affect the movement track of the terminal device relative to the first network device. Therefore, relatively accurate switching information may be obtained based on the movement direction of the terminal device relative to the first network device. It may be understood that, usually, when the speed of the terminal device is relatively high, the movement direction of the terminal device relative to the first network device has relatively large impact on the movement track of the terminal device relative to the first network device. Therefore, optionally, when the speed of the terminal device is relatively high, relatively accurate switching information is obtained with reference to the movement direction of the terminal device relative to the first network device.

Alternatively, the movement state information of the terminal device may be used to feed back the speed at which the terminal device leaves the coverage area of the first beam, and the speed at which the terminal device leaves the coverage area of the first beam may reflect a movement condition of the terminal device relative to the first network device. For example, when the speed at which the terminal device leaves the coverage area of the first beam is higher, a relatively small value of N may be set, or when the speed at which the terminal device leaves the coverage area of the first beam is lower, a relatively large value of N may be set.

It should be noted that, during actual application, if the first network device cannot obtain the movement state information of the terminal device, a default speed of the terminal device may be used. For example, a speed of the terminal device relative to ground is 0 by default. This is not specifically limited in this embodiment of this application.

In this embodiment of this application, the user information of the terminal device includes the movement state information of the terminal device, and a beam to which the terminal device may be switched may be determined by using the movement state information of the terminal device. In this way, when the switching information is subsequently determined based on the user information of the terminal device in this application, the relatively accurate switching information can be obtained.

Optionally, the movement information of the first network device includes at least one of the following: movement direction information of the first network device and information about a coverage area of a beam adjacent to the coverage area of the first beam.

In this embodiment of this application, movement direction information of the first network device may be used to feed back a movement trend of the first network device relative to the terminal device, to further obtain the movement track of the terminal device relative to the first network device.

In this embodiment of this application, information about a coverage area of a beam adjacent to the coverage area of the first beam may be a second beam adjacent to the first beam and a coverage area of the second beam. The second beam may be generated by the first network device, or may be generated by another network device different from the first network device. Therefore, after the movement track of the terminal device relative to the first network device is obtained, one or more second beams spanned by the movement track and duration required by the terminal device to leave each second beam may be obtained, to further obtain accurate switching information of the terminal device.

Optionally, in step S402, the switching information may be carried in a radio resource control (RRC) message for transmission. For example, a switching command (mobility controlInfo) information element (IE) carried in the RRC message includes the switching information.

For example, the switching information is delivered by a satellite by using UE-Special-Beam-Switch signaling, and corresponding code may be:

```
-- ASN1START
-- Beam-Switch-ConfigSpecial -START
Beam-Switch-ConfigSpecial ::=        SEQUENCE {
    Beam-Switch-Info                    BEAM-Switch-Info0,
    Beam-Switch-Info                    BEAM-Switch-
                                        info1,
    ...
    Beam-Switch-Info                    BEAM-Switch-
                                        Infon,
}
Beam-Switch-Info ::=                 SEQUENCE {
    Cell-Id                             CELL-Id,
    bwp-Id                              BWP-Id,
    time-interval                       TIME-Interval,
    TA-Rate                             TA-RATE,
    Common-TA                           COMMON-TA,
    Doppler-Rate                        DOPPLER-RATE,
    DlDopplerPreCompenValue             DlDopplerPreCompenValue,
```

-continued

```
    UlDopplerPreCompenValue             UlDopplerPreCompenValue,
    Polarization-Direction              POLARIZATION-DIRECTION,
}
-- TAG-RACH-ConfigCommon-
STOP
-- ASN1STOP
```

Each Beam-Switch-Info may represent one switching item. Cell-Id and bwp-Id included in Beam-Switch-Info may be used to identify the second beam, time-interval is time information, TA-Rate may be an uplink timing transformation rate of the second beam, Common-TA may be a general value specified based on an actual situation, Doppler-Rate may be a Doppler transformation rate of the second beam, DlDopplerPreCompenValue may be a downlink Doppler compensation value, UlDopplerPreCompenValue may be an uplink Doppler compensation value, and Polarization-Direction may represent a direction of the second beam. It may be understood that one or more TA-Rates, Common-TAs, Doppler-Rates. DlDopplerPreCompenValues, UlDopplerPreCompenValues, and Polarization-Directions may be optionally set based on an actual application situation. This is not specifically limited in this embodiment of this application.

In an optional implementation of this embodiment of this application, the first network device may further group a plurality of terminal devices that have same or similar movement tracks relative to the first network device into a terminal device group, and same switching information is configured for all the terminal devices in the terminal device group.

Figure 7:
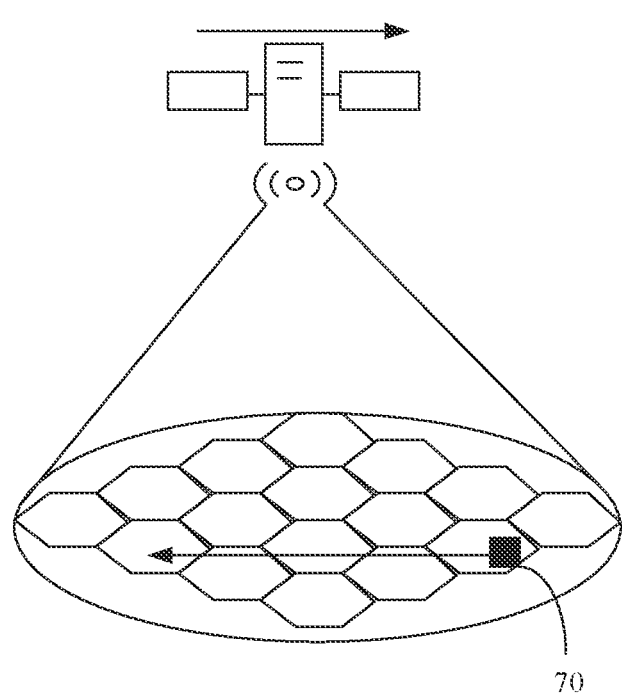
FIG. 7 is a schematic diagram of a movement track of a terminal device group in a plurality of beams according to an embodiment of this application.

For example, as shown in FIG. 7, the first network device may obtain user information of a plurality of terminal devices within the coverage area of the first beam, calculate movement tracks of the terminal devices relative to the first network device in a future time, and group terminal devices with similar movement tracks into a first group 70. Further, the first network device may obtain switching information of the first group based on a movement track of any terminal device in the first group relative to the first network device in the future time in the foregoing manner of calculating the switching information, and send the switching information to each terminal device in the first group. Then, each terminal device may separately perform the switching process in the foregoing embodiment based on the switching information. Details are not described herein again.

In this embodiment of this application, mobile terminals that have similar movement tracks relative to the first network device in the future time may be grouped. For one group, switching information corresponding to the group only needs to be calculated once, to obtain switching information of all the terminal devices in the group. Compared with the manner of calculating the switching information for each terminal device, the manner in this embodiment of this application can save computing resources of the first network device.

It may be understood that, during actual application, if a high-speed moving terminal device exists in the plurality of terminal devices, for example, a terminal device disposed on a high-speed train or an airplane exists in the plurality of terminal devices, in this case, a movement track of the high-speed moving terminal relative to the first network device in a future time is usually different from that of a low-speed moving terminal device or a static terminal device. Therefore, during grouping, the group may not include the high-speed moving terminal device. Further, for terminal devices outside the group, switching information may be calculated in a manner of separately calculating the switching information.

Certainly, if a plurality of terminal devices are simultaneously in a high-speed moving state, such as mobile terminals used by a plurality of passengers in a high-speed train or an airplane, the mobile terminals may be divided into one group and configured with same switching information because movement speeds of the mobile terminals are all the same as or similar to the movement speed of the high-speed train or airplane. This is not specifically limited in this embodiment of this application.

For example, switching information of the first group is delivered by the satellite by using UE-Group-Beam-Switch signaling, and corresponding code may be:

```
-- ASN1START
-- Beam-Switch-ConfigSpecial -START
Beam-Switch-ConfigGroup ::=          SEQUENCE {
    Beam-Switch-Info                     BEAM-Switch-Info0,
    Beam-Switch-Info                         BEAM-Switch-
                                             info1,
    ...
    Beam-Switch-Info                         BEAM-Switch-
                                             Infon,
}
Beam-Switch-Info ::=                 SEQUENCE {
    Cell-Id                              CELL-Id,
    bwp-Id                               BWP-Id,
    time-interval                        TIME-Interval,
    TA-Rate                              TA-RATE,
    Common-TA                                COMMON-TA,
    Doppler-Rate                         DOPPLER-RATE,
    DlDopplerPreCompenValue              DlDopplerPreCompenValue,
    UlDopplerPreCompenValue              UlDopplerPreCompenValue,
    Polarization-Direction           POLARIZATION-DIRECTION,
}
-- TAG-RACH-ConfigCommon-
STOP
-- ASN1STOP
```

Each Beam-Switch-Info may represent one switching item, Cell-Id and bwp-Id included in Beam-Switch-Info may be used to identify the second beam, time-interval is time information, TA-Rate may be an uplink timing transformation rate of the second beam. Common-TA may be a general value specified based on an actual situation, Doppler-Rate may be a Doppler transformation rate of the second beam, DlDopplerPreCompenValue may be a downlink Doppler compensation value, UlDopplerPreCompenValue may be an uplink Doppler compensation value, and Polarization-Direction may represent a direction of the second beam. It may be understood that one or more TA-Rates, Common-TAs, Doppler-Rates, DlDopplerPreCompenValues, UlDoppler-PreCompenValues, and Polarization-Directions may be optionally set based on an actual application situation. This is not specifically limited in this embodiment of this application.

During specific application, if any terminal device in the first group fails in beam switching in any one of N times of beam switching, the terminal device that fails in beam switching may enter a process of reconfiguring the switching information, or after all the terminal devices in the first group complete the N times of beam switching, a process of regrouping the plurality of terminal devices and reconfiguring the switching information may be performed. In addition, when each terminal device of the first group implements beam switching, the first network device may update a user list in the first network device. For example, when any terminal device switches to the second beam, the terminal device is deleted from the user list corresponding to the first beam, to implement a complete beam switching process. This is not specifically limited in this embodiment of this application.

It should be noted that, in the foregoing embodiment, description is provided by using an example in which the first network device is a satellite. During specific application, the first network device may alternatively be a core network device communicating with the satellite. It may be understood that when the first network device is the core network device, the satellite may be used only as a receiving and sending device, and movement information of the first network device may be movement information of the satellite communicating with the core network device. Steps of determining beam switching in this embodiment of this application are all performed by the core network device, so that operation load of the satellite can be reduced by using the core network device. A specific method for determining beam switching is similar to a manner of determining the first network device as a satellite. Details are not described herein again.

In conclusion, in this embodiment of this application, the first network device may obtain the switching information based on the user information of the terminal device, and the like, so that after the first network device sends the switching information to the terminal device, the terminal device may perform beam switching for N times based on the switching information. During beam switching for N times, the first network device needs to obtain the user information only once, and can configure switching items of switching for subsequent N times in advance at a time. Compared with that operations in the conventional technology, such as obtaining user information, need to be performed each time switching information is configured, the method in this embodiment of this application can reduce signaling procedures and overheads of a network, and a switching response time can be further reduced.

Figure 8A:
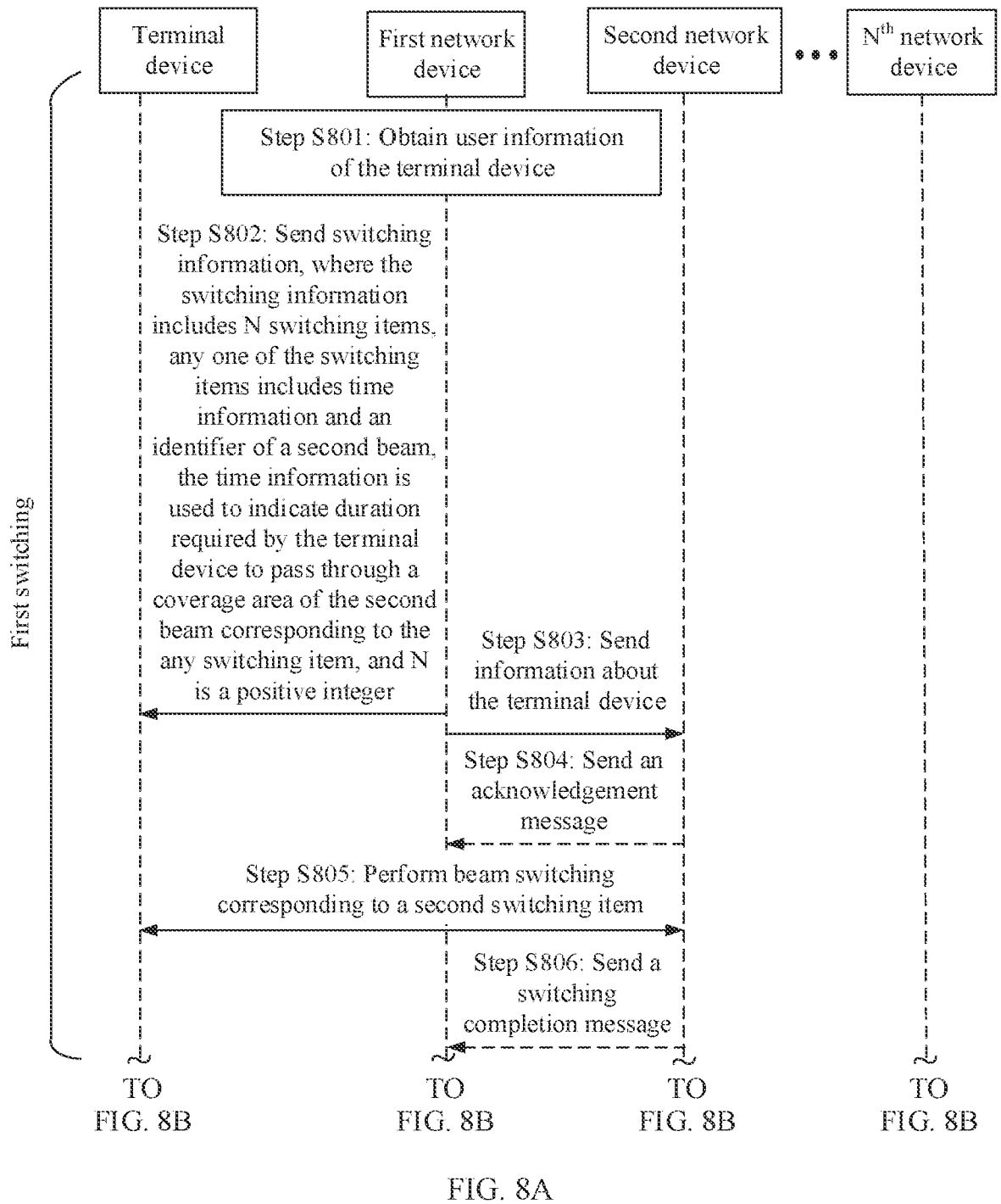

For example, N is a value greater than or equal to 2, the N switching items include a second switching item, an $N^{th}$ switching item, and the like, a second beam corresponding to the second switching item is generated by the second network device, and the $N^{th}$ switching item is generated by an $N^{th}$ network. An example in which the terminal device performs beam switching for successive N times based on the switching information is used. FIG. 8A and FIG. 8B are a schematic flowchart of signaling exchange of a network switching method according to an embodiment of this application. The signaling exchange of the method provided in this embodiment may include the following steps.

Step S801: A first network device obtains user information of a terminal device, where the terminal device is currently located in a coverage area of a first beam.

Step S802: The first network device sends switching information to the terminal device, where the switching information includes N switching items, and any one of the switching items includes time information and an identifier of a second beam, where the time information is used to indicate duration required by the terminal device to pass through a coverage area of the second beam corresponding to the any switching item, and N is a positive integer.

For step S801 and step S802, refer to the description of the embodiment corresponding to FIG. 4, and details are not described herein again. Different from the embodiment in FIG. 4, this embodiment is described by using an example in which the N switching items include the second switching item, the $N^{th}$ switching item, and the like.

Step S803: The first network device sends information about the terminal device to a second network device.

Step S804: The second network device sends an acknowledgement message to the first network device.

By using step S803 and step S804, the second network device may reserve a resource for the terminal device within a time corresponding to the second switching item.

Step S805: The second network device performs beam switching corresponding to the second switching item with the terminal device.

For step S805 refer to the description of the embodiment corresponding to FIG. 4 about beam switching between the second network device and the terminal device, and details are not described herein again.

It may be understood that after the terminal device successfully switches to the second network device, the terminal device may delete a first switching item, to reduce occupation of resources.

Step S806: The second network device sends a switching completion message to the first network device.

During specific application, the second network device may send the switching completion message to the first network device, to indicate that the terminal device successfully switches from the first network device to the second network device. Adaptively, the first network device may update a user list. This is not specifically limited in this embodiment of this application.

Step S807: An $(N-1)^{th}$ network device sends the information about the terminal device to the $N^{th}$ network device.

Step S808: The $N^{th}$ network device sends the acknowledgement message to the $(N-1)^{th}$ network device.

During specific application, after the terminal device successfully switches to the second network device, the second network device may take over a function of the first network device, send the information about the terminal device to a third network device, and receive an acknowledgment message of the third network device.

By analogy, after the terminal device successfully switches to the $(N-1)^{th}$ network device, the $(N-1)^{th}$ network device may take over a function of an $(N-2)^{th}$ network device, send the information about the terminal device to the $N^{th}$ network device, and receive an acknowledgement message of the $N^{th}$ network device.

Step S809: The $N^{th}$ network device performs beam switching corresponding to the $N^{th}$ switching item with the terminal device.

A process in which the $N^{th}$ network device performs beam switching corresponding to the $N^{th}$ switching item with the terminal device is similar to a process in which the second network device performs beam switching with the terminal device. For step S809, refer to the description of the embodiment corresponding to FIG. 4 about beam switching between the second network device and the terminal device, and details are not described herein again.

Step S810: The network device sends a switching completion message to the second network device.

It should be noted that there may be optional steps in step S801 to step S810. For example, steps corresponding to the dashed line part shown in FIG. 8A and FIG. 8B may be optional steps. During actual application, steps may be properly selected based on a situation. This is not specifically limited in this embodiment of this application.

In conclusion, in this embodiment of this application, the first network device may obtain the switching information based on the user information of the terminal device, and the like, so that after the first network device sends the switching information to the terminal device, the terminal device may perform beam switching for N times based on the switching information. During beam switching for N times, the first network device needs to obtain the user information only once, and can configure switching items of switching for subsequent N times in advance at a time. Compared with that operations in the conventional technology, such as obtaining user information, need to be performed each time switching information is configured, the method in this embodiment of this application can reduce signaling procedures and overheads of a network, and a switching response time can be further reduced.

FIG. 9 is a schematic flowchart of a network switching method according to an embodiment of this application. The method provided in this embodiment includes the following steps.

Step S901: A terminal device receives switching information sent by a first network device, where the switching information includes N switching items, and any one of the switching items includes time information and an identifier of a second beam, where the time information is used to indicate duration required by the terminal device to pass through a coverage area of the second beam corresponding to the any switching item, and N is a positive integer.

Step S902: The terminal device performs beam switching based on the switching information.

Optionally, N is 1.

Optionally, N is an integer greater than or equal to 2, and that the terminal device performs beam switching based on the switching information includes: The terminal device performs beam switching for successive N times based on the switching information.

Optionally, that the terminal device performs beam switching based on the switching information includes: For a first switching item in the N switching items, the terminal device switches, at a start moment corresponding to the first switching item, to a second beam corresponding to the first switching item.

Optionally, the switching information is obtained based on user information of the terminal device and movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam.

Optionally, the movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. That the terminal device performs beam switching for successive N times based on the switching information includes: For the second switching item, the terminal device measures, within a time corresponding to the second switching item, signal quality of the terminal device in the second beam corresponding to the second switching item; the terminal device sends a switching request to the second network device when the signal quality is greater than a threshold; and the terminal device receives a switching response message sent by the second network device and switches to the second beam corresponding to the second switching hem.

Optionally, the method further includes: The terminal device sends the user information of the terminal device to the first network device.

The terminal device in this embodiment may be configured to perform the method on the terminal device side in the embodiment corresponding to FIG. 4 or FIG. 8A and FIG. 8B. Specific implementations and technical effects are similar. Details are not described herein again.

Figure 10:
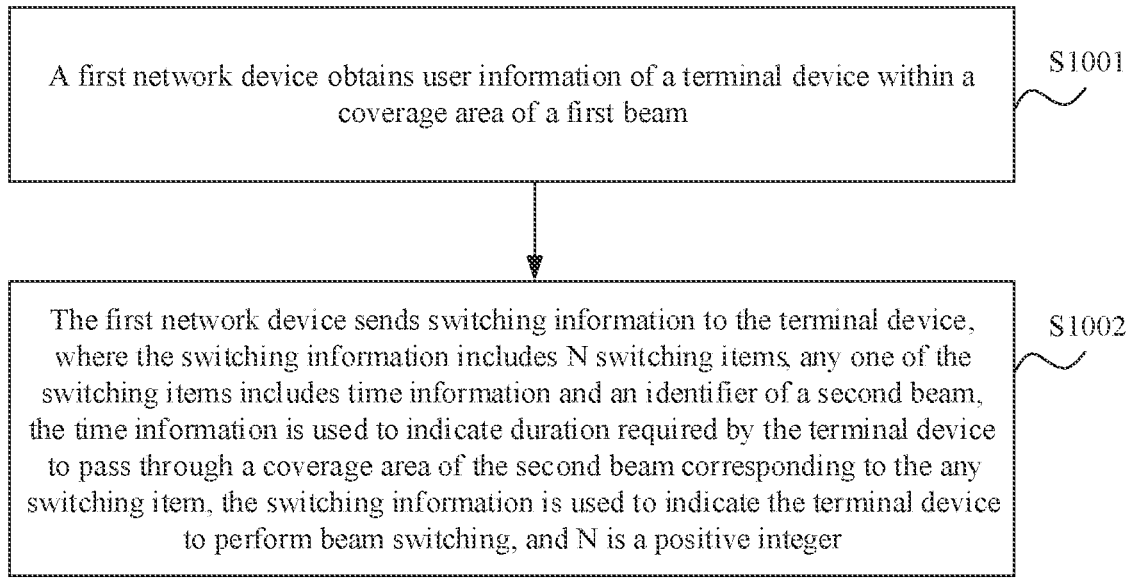
FIG. 10 is a schematic flowchart of another network switching method according to an embodiment of this application.

FIG. 10 is a schematic flowchart of another network switching method according to an embodiment of this application. The method provided in this embodiment includes the following steps.

Step S1001: A first network device obtains user information of a terminal device within a coverage area of a first beam.

Step S1002: The first network device sends switching information to the terminal device, where the switching information includes N switching items, and any one of the switching items includes time information and an identifier of a second beam, where the time information is used to indicate duration required by the terminal device to pass through a coverage area of the second beam corresponding to the any switching item, the switching information is used to indicate the terminal device to perform beam switching, and N is a positive integer.

Optionally, N is 1.

Optionally, N is an integer greater than or equal to 2, and that the terminal device performs beam switching based on the switching information includes: The terminal device performs beam switching for successive N times based on the switching information.

Optionally, for a first switching item in the N switching items, the first network device switches, at a start moment corresponding to the first switching item, the terminal device to a second beam corresponding to the first switching item.

Optionally, the switching information is obtained based on user information of the terminal device and movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam.

Optionally, the movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. The method further includes: The first network device sends a message including information about the terminal device to the second network device, where the message is used for the second network device to reserve a resource for the terminal device within a time corresponding to the second switching item.

Optionally, the terminal device belongs to a first group, the first group includes a plurality of terminal devices, and the terminal devices in the first group receive same switching information sent by the first network device.

Optionally, the method further includes: The first network device receives the user information of the terminal device that is sent by the terminal device.

The first network device in this embodiment may be configured to perform the method on the first network device side in the embodiment corresponding to FIG. 4 or FIG. 8A and FIG. 8B. Specific implementations and technical effects are similar. Details are not described herein again.

Figure 11:
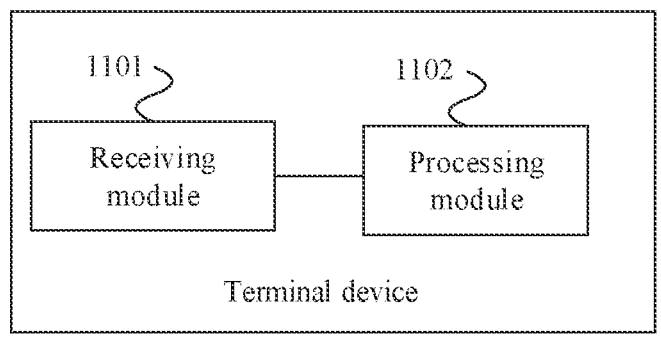
FIG. 11 is a schematic diagram of a structure of a terminal device according to an embodiment of this application.

FIG. 11 shows a schematic diagram of a structure of a terminal device according to an embodiment of this application. The terminal device in this embodiment of this application includes a receiving module 1101 and a processing module 1102. The receiving module is configured to receive switching information sent by a first network device, where the switching information includes N switching items, and any one of the switching items includes time information and an identifier of a second beam, where the time information is used to indicate duration required by the terminal device to pass through a coverage area of the second beam corresponding to the any switching item, and N is a positive integer and the processing module is configured to perform beam switching based on the switching information.

Optionally, N is 1.

Optionally. N is an integer greater than or equal to 2, and the processing module is specifically configured to perform beam switching for successive N times based on the switching information.

Optionally, the processing module is further specifically configured to: for a first switching item in the N switching items, switch, at a start moment corresponding to the first switching item, to a second beam corresponding to the first switching item.

Optionally, the switching information is obtained based on user information of the terminal device and/or movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam. The movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. The processing module is further specifically configured to: for the second switching item, measure, within a time corresponding to the second switching item, signal quality of the terminal device in the second beam corresponding to the second switching item; send a switching request to the second network device when the signal quality is greater than a threshold; and receive a switching response message sent by the second network device and switch to the second beam corresponding to the second switching item.

Figure 12:
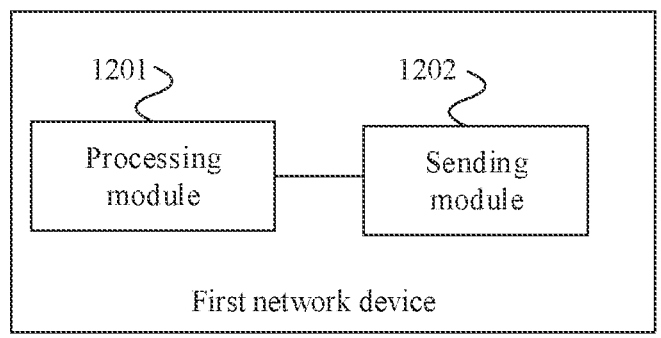
FIG. 12 is a schematic diagram of a structure of a first network device according to an embodiment of this application.

FIG. 12 shows a schematic diagram of a structure of a first network device according to an embodiment of this application. A first network device in this embodiment of this application includes a processing module 1201 and a sending module 1202. The processing module is configured to obtain user information of a terminal device within a coverage area of a first beam; and the sending module is configured to send switching information to the terminal device, where the switching information includes N switching items, and any one of the switching items includes time information and an identifier of a second beam, where the time information is used to indicate duration required by the terminal device to pass through a coverage area of the second beam corresponding to the any switching item, the switching information is used to indicate the terminal device to perform beam switching, and N is a positive integer.

Optionally, N is 1.

Optionally, N is an integer greater than or equal to 2, and the switching information is used to indicate the terminal device to perform beam switching for successive N times.

Optionally, the processing module is further configured to: for a first switching item in the N switching items, switch, at a start moment corresponding to the first switching item, the terminal device to a second beam corresponding to the first switching item.

Optionally, the terminal device belongs to a first group, the first group includes a plurality of terminal devices, and the terminal devices in the first group receive same switching information sent by the first network device.

Optionally, the switching information is obtained based on the user information and/or movement information of the first network device, where the user information of the terminal device includes at least one of the following: geographical location information of the terminal device and movement state information of the terminal device. The movement state information of the terminal device is used to indicate a speed of the terminal device relative to ground, and/or, a movement direction of the terminal device relative to the first network device, and/or, a speed at which the terminal device leaves a coverage area of a first beam. The movement information of the first network device includes at least one of the following: movement direction information of the first network device and information about a coverage area of a beam adjacent to the coverage area of the first beam.

Optionally, a higher speed at which the terminal device leaves the coverage area of the first beam indicates a smaller value of N.

Optionally, the N switching items include a second switching item, and a second beam corresponding to the second switching item is generated by a second network device. The sending module is further configured to send a message including information about the terminal device to the second network device, where the message is used for the second network device to reserve a resource for the terminal device within a time corresponding to the second switching item.

Figure 13:
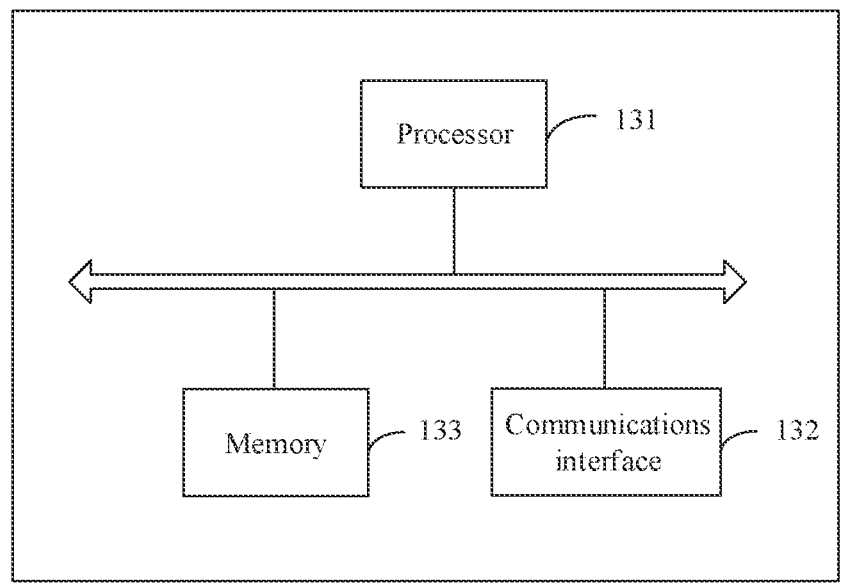
FIG. 13 is a schematic diagram of a hardware structure of a communications apparatus according to an embodiment of this application.

FIG. 13 is a schematic diagram of a hardware structure of a communications apparatus according to an embodiment of this application. As shown in FIG. 13, the communications apparatus includes a processor 131 and a communications interface 132. For example, the processor 131 and the communications interface 132 may communicate with each other by using a communications bus. The communications interface 132 is configured to: receive to-be-processed data and output processed data. The processor is configured to perform any method shown in the embodiment corresponding to FIG. 4 or FIG. 8A and FIG. 8B on the to-be-processed data. When the communications apparatus is applied to a terminal device, the to-be-processed data may be switching information or the like in this embodiment of this application, and the processed data may be switching data corresponding to each switching item, or the like. When the communications apparatus is applied to the first network device, the to-be-processed data may be user information of the terminal device, or the like, and the processed data may be switching information, or the like.

Optionally, the communications interface 132 may further include a transmitter and/or a receiver.

Optionally, the foregoing processor may be a central processing unit (CPU), or may be another general-purpose processor, a digital signal processor (DSP), an application specific integrated circuit (SIC), or the like. The general-purpose processor may be a microprocessor, or the processor may be any conventional processor or the like. The steps of the methods disclosed with reference to embodiments of this application may be directly performed by a hardware processor, or may be performed by using a combination of hardware in the processor and a software module.

Optionally, the communications apparatus further includes a memory 133, configured to store program instructions, and when the program instructions are executed by the processor, the method shown in the embodiment shown in FIG. 4 or FIG. 5A and FIG. 5B is performed. The memory and the processor may be independent units, or may be integrated together. This is not specifically limited in this embodiment of this application.

Figure 14:
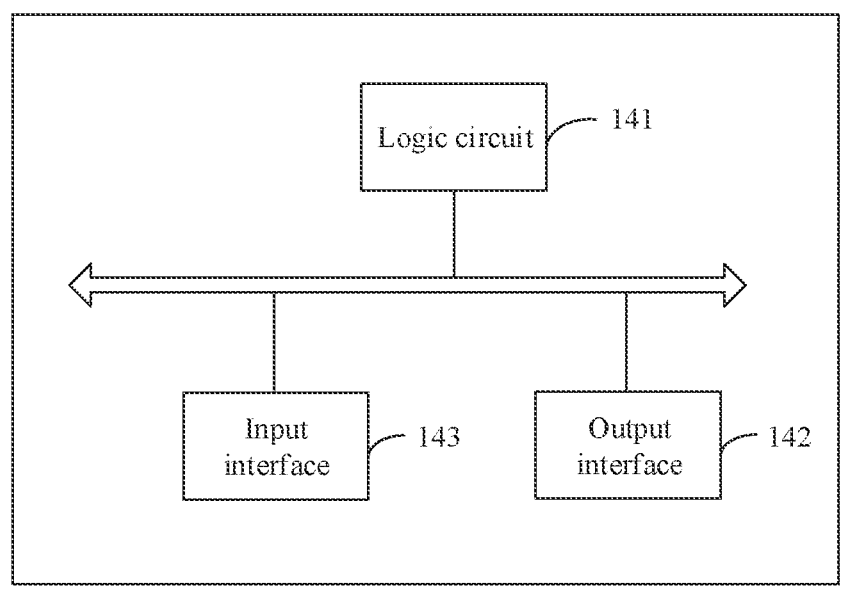
FIG. 14 is a schematic diagram of a hardware structure of another communications apparatus according to an embodiment of this application.

FIG. 14 is a schematic diagram of a hardware structure of another communications apparatus according to an embodiment of this application. As shown in FIG. 14, the communications apparatus includes a logic circuit 141, an input interface 143, and an output interface 142. The input interface is configured to obtain to-be-processed data. The logic circuit is configured to perform the method shown in the embodiment corresponding to FIG. 4 or FIG. 8A and FIG. 5B on the to-be-processed data, to obtain the processed data. The output interface is configured to output the processed data. When the communications apparatus is applied to a terminal device, the to-be-processed data may be switching information or the like in this embodiment of this application, and the processed data may be switching data corresponding to each switching item, or the like. When the communications apparatus is applied to the first network device, the to-be-processed data may be user information of the terminal device, or the like, and the processed data may be switching information, or the like.

An embodiment of this application further provides a chip. The chip includes any one of the foregoing communications apparatuses, or is configured to support the communications apparatus in implementing functions shown in the embodiments of this application (for example, a first network device receives user information of a terminal device, where the terminal device is currently located in a coverage area of a first beam; the first network device sends switching information to the terminal device, where the switching information includes N switching items, and any one of the switching items includes time information and an identifier of a second beam, where the time information is used to indicate duration required by the terminal device to pass through a coverage area of the second beam corresponding to the any switching item, and N is a positive integer; and the terminal device performs beam switching based on the switching information). The chip may be specifically used in a chip system. The chip system may include chips, or may include a chip and another discrete device. When the foregoing methods are implemented by using a chip in the terminal device, the chip includes a processing unit. Further, the chip may further include a communications unit. The processing unit may be, for example, a processor. When the chip includes the communications unit, the communications unit may be, for example, an input/output interface, a pin, or a circuit. The processing unit performs all or some actions performed by processing modules in embodiments of this application, and the communications unit may perform a corresponding receiving or sending action, for example, the communications unit may receive configuration signaling sent by a network device.

An embodiment of this application provides a computer-readable storage medium, where the computer-readable storage medium is configured to store computer programs, and the computer programs are configured to implement the method shown in the embodiment shown in FIG. 4 or FIG. 5A and FIG. 8B.

An embodiment of this application further provides a communications system, including the terminal device in FIG. 11 and the first network apparatus in FIG. 12.

In the several embodiments provided in this application, it should be understood that the disclosed apparatus and method may be implemented in other manners. For example, the described apparatus embodiments are merely examples. For example, division into units is merely logical function division. During actual implementation, there may be another division manner. For example, a plurality of units or components may be combined or integrated into another system, or some features may be ignored or not performed. In addition, the displayed or discussed mutual couplings or direct couplings or communications connections may be implemented through some interfaces, and the indirect couplings or communications connections between apparatuses or units may be implemented in an electrical form, a mechanical form, or another form. The units described as separate components may or may not be physically separated, and components displayed as units may or may not be physical units. That is, the units may be located in one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units may be integrated into one unit. The integrated unit may be implemented in a form of hardware, or may be implemented in a form of hardware and a software function unit.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of another programmable data processing device to generate a machine, so that instructions executed by the computer or the processing unit of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A network switching method, comprising:
   receiving, by a terminal device, switching information sent by a first network device, wherein the switching information comprises N switching items, each switching item of the N switching items comprises time information and an identifier of a second beam, the time information indicates a time duration for the terminal device to pass through a coverage area of the second beam, and N is a positive integer; and
   performing, by the terminal device, beam switching based on the switching information, wherein a higher speed at which the terminal device leaves a coverage area of a first beam indicates a smaller value of N.

2. The method according to claim 1, wherein N is an integer greater than or equal to 2, and performing, by the terminal device, the beam switching comprises:
   performing, by the terminal device, the beam switching for successive N times based on the switching information.

3. The method according to claim 2, wherein the N switching items comprise a second switching item, a second beam corresponding to the second switching item is generated by a second network device, and performing, by the terminal device, the beam switching for the successive N times comprises:
   for the second switching item, measuring, by the terminal device within a time corresponding to the second switching item, signal quality of the terminal device in the second beam corresponding to the second switching item;
   sending, by the terminal device, a switching request to the second network device when the signal quality is greater than a threshold;
   receiving, by the terminal device, a switching response message sent by the second network device; and
   switching, by the terminal device, to the second beam corresponding to the second switching item.

4. The method according to claim 1, wherein performing, by the terminal device, the beam switching comprises:
   for a first switching item in the N switching items, switching, by the terminal device at a start moment corresponding to the first switching item, to a second beam corresponding to the first switching item.

5. The method according to claim 1, wherein the switching information is obtained based on user information of the terminal device or movement information of the first network device, and wherein:
- the user information of the terminal device comprises geographical location information of the terminal device or movement state information of the terminal device, and the movement state information of the terminal device indicates at least one of a speed of the terminal device relative to ground, a movement direction of the terminal device relative to the first network device, or a speed at which the terminal device leaves the coverage area of the first beam; and
- the movement information of the first network device comprises at least one of movement direction information of the first network device or information about a coverage area of a beam adjacent to the coverage area of the first beam.

6. A network switching method, comprising:
- obtaining, by a first network device, user information of a terminal device within a coverage area of a first beam; and
- sending, by the first network device, switching information to the terminal device, wherein the switching information comprises N switching items, each switching item of the N switching items comprises time information and an identifier of a second beam, the time information indicates a time duration for the terminal device to pass through a coverage area of the second beam, the switching information indicates the terminal device to perform beam switching, and N is a positive integer, and wherein a higher speed at which the terminal device leaves the coverage area of the first beam indicates a smaller value of N.

7. The method according to claim 6, wherein N is an integer greater than or equal to 2, and the switching information indicates the terminal device to perform the beam switching for successive N times.

8. The method according to claim 6, wherein the method further comprises:
- for a first switching item in the N switching items, switching, by the first network device at a start moment corresponding to the first switching item, the terminal device to a second beam corresponding to the first switching item.

9. The method according to claim 6, wherein the terminal device belongs to a first group, the first group comprises a plurality of terminal devices, and the plurality of terminal devices in the first group receive same switching information sent by the first network device.

10. The method according to claim 6, wherein the switching information is obtained based on the user information or movement information of the first network device, and wherein:
- the user information of the terminal device comprises geographical location information of the terminal device or movement state information of the terminal device, and the movement state information of the terminal device indicates at least one of a speed of the terminal device relative to ground, a movement direction of the terminal device relative to the first network device, or a speed at which the terminal device leaves the coverage area of the first beam; and
- the movement information of the first network device comprises at least one of movement direction information of the first network device or information about a coverage area of a beam adjacent to the coverage area of the first beam.

11. The method according to claim 6, wherein the N switching items comprise a second switching item, a second beam corresponding to the second switching item is generated by a second network device, and the method further comprises:
- sending, by the first network device, a message comprising information about the terminal device to the second network device, wherein the message is used for the second network device to reserve a resource for the terminal device within a time corresponding to the second switching item.

12. A communications apparatus, comprising at least one processor and a memory, wherein the memory stores program instructions for execution by the at least one processor to:
- receive switching information sent by a first network device, wherein the switching information comprises N switching items, each switching item of the N switching items comprises time information and an identifier of a second beam, the time information indicates a time duration for a terminal device to pass through a coverage area of the second beam, N is a positive integer, and the terminal device comprises the communications apparatus; and
- perform beam switching based on the switching information, wherein a higher speed at which the terminal device leaves a coverage area of a first beam indicates a smaller value of N.

13. The communications apparatus according to claim 12, wherein N is 1.

14. The communications apparatus according to claim 12, wherein N is an integer greater than or equal to 2, and the program instructions are for execution by the at least one processor to perform the beam switching for successive N times based on the switching information.

15. The terminal device according to claim 14, wherein the N switching items comprise a second switching item, a second beam corresponding to the second switching item is generated by a second network device, and the program instructions are for execution by the at least one processor to:
- for the second switching item, measure, within a time corresponding to the second switching item, signal quality of the terminal device in the second beam corresponding to the second switching item;
- send a switching request to the second network device when the signal quality is greater than a threshold;
- receive a switching response message sent by the second network device; and
- switch to the second beam corresponding to the second switching item.

16. The communications apparatus according to claim 12, wherein the program instructions are for execution by the at least one processor to: for a first switching item in the N switching items, switch, at a start moment corresponding to the first switching item, to a second beam corresponding to the first switching item.

17. The communications apparatus according to claim 12, wherein the switching information is obtained based on user information of the terminal device or movement information of the first network device, and wherein:
- the user information of the terminal device comprises geographical location information of the terminal device or movement state information of the terminal device, and the movement state information of the terminal device indicates at least one of a speed of the terminal device relative to ground, a movement direction of the terminal device relative to the first network device, or a speed at which the terminal device leaves the coverage area of the first beam; and the movement information of the first network device comprises at least one of movement direction information of the first network device or information about a coverage area of a beam adjacent to the coverage area of the first beam.

* * * * *